United States Patent
Arai

(10) Patent No.: US 7,241,472 B2
(45) Date of Patent: Jul. 10, 2007

(54) METHOD FOR PRODUCING ANTIREFLECTION FILM-COATED PLASTIC LENS, AND ANTIREFLECTION FILM-COATED PLASTIC LENS

(75) Inventor: Akiko Arai, Tokyo (JP)

(73) Assignee: Hoya Corporation, Tokyo (JP)

( * ) Notice: Subject to any disclaimer, the term of this patent is extended or adjusted under 35 U.S.C. 154(b) by 279 days.

(21) Appl. No.: 11/116,411

(22) Filed: Apr. 28, 2005

(65) Prior Publication Data

US 2006/0003094 A1    Jan. 5, 2006

Related U.S. Application Data

(63) Continuation of application No. 10/316,105, filed on Dec. 11, 2002, now abandoned.

(30) Foreign Application Priority Data

Dec. 25, 2001 (JP) .............................. 2001-391306

(51) Int. Cl.
*B05D 5/06* (2006.01)

(52) U.S. Cl. ....................... 427/162; 427/164; 427/532; 427/533; 427/248.1; 427/255.28; 427/255.7; 427/322; 427/336; 427/337; 427/402; 427/421; 351/166; 351/177; 359/580; 359/581; 359/582; 264/1.32; 264/1.7; 264/1.1

(58) Field of Classification Search ..................... None
See application file for complete search history.

(56) References Cited

U.S. PATENT DOCUMENTS

| | | | |
|---|---|---|---|
| 5,015,523 A | 5/1991 | Kawashima et al. | |
| 5,534,297 A | 7/1996 | Ogisu et al. | |
| 6,080,531 A | 6/2000 | Carter et al. | |
| 2001/0042555 A1 | 11/2001 | Bergman et al. | |

FOREIGN PATENT DOCUMENTS

| | | |
|---|---|---|
| EP | 0 699 926 | 3/1995 |
| JP | 03-217230 | 9/1991 |
| JP | 06-025603 | 2/1994 |
| JP | 09-021901 | 1/1997 |
| JP | 10-306258 | 11/1998 |
| JP | 2001-141905 | 5/2001 |

*Primary Examiner*—Alain L. Bashore
(74) *Attorney, Agent, or Firm*—Morrison & Foerster LLP

(57) ABSTRACT

The method produces a plastic lens with an antireflection film which have the advantages of good adhesion of the antireflection film to any type of hard coat film that underlies it and good abrasion resistance and provides a plastic lens with an antireflection film. The method includes the steps of applying water or an aqueous solution to a plastic lens with an organosilicon compound-containing hard coat film to form a liquid film of water or the aqueous solution on the surface of the hard coat film, then allowing ozone gas to contact with the liquid film to treat the surface of the hard coat film with the ozone gas, and thereafter forming an antireflection film on the surface of the hard coat film through vapor deposition.

14 Claims, 1 Drawing Sheet

METHOD FOR PRODUCING ANTIREFLECTION FILM-COATED PLASTIC LENS, AND ANTIREFLECTION FILM-COATED PLASTIC LENS

This application is a continuation of Ser. No. 10/316,105, filed Dec. 11, 2002, now abandoned which claims foreign priority to Japanese Application No. 2001-391306, filed Dec. 25, 2001. These prior applications are hereby incorporated by reference.

FIELD OF THE INVENTION

The present invention relates to a method for producing a plastic lens with an antireflection film and to a plastic lens with an antireflection film. More precisely, the invention relates to a method of producing a plastic lens having the advantages of good adhesion of the antireflection film to the hard coat film that underlies the antireflection film and good abrasion resistance, and to a plastic lens.

BACKGROUND OF THE INVENTION

To prevent the deterioration of adhesion between a hard coat film and an antireflection film of a plastic lens and abrasion resistance thereof, it is known to treat the surface of the hard coat film with oxygen radicals, that is, with ozone gas or ozone water. One example of the method of producing such a plastic lens is disclosed in JP-A-2001-141905, in which the surface of a hard coat film of a plastic lens substrate with a hard coat film containing titanium oxide fine particles is treated with ozone gas or dipped into ozone water and then an antireflection film is formed on the treated hard coat film through vapor deposition.

However, when the hard coat film formed on a plastic lens substrate contains metal oxide particles other than titanium oxide particles, such as silicon oxide particles, and when its surface is treated with ozone gas or ozone water according to this prior art method, there is a probability that the adhesion of the hard coat film to the antireflection film that overlies it and also the abrasion resistance of the thus-coated plastic lenses inevitably deteriorate.

SUMMARY OF THE INVENTION

This invention provides a method for producing a plastic lens with an antireflection film having good adhesion of the antireflection film to any type of hard coat film that underlies it and good abrasion resistance, and provides a plastic lens with an antireflection film.

This invention involves forming a liquid film of water or an aqueous solution on the surface of the hard coat film of a plastic lens before an antireflection film is formed on the hard coat film, followed by treating the film with ozone gas. Specifically, the invention provides a method for producing a plastic lens with an antireflection film, which comprises applying water or an aqueous solution to a plastic lens with an organosilicon compound-containing hard coat film to form a liquid film of water or the aqueous solution on the surface of the hard coat film, allowing ozone gas to contact with the liquid film to treat the surface of the hard coat film with the ozone gas, and thereafter forming the antireflection film on the surface of the hard coat film through vapor deposition, and provides a plastic lens with an antireflection film obtained by this production method.

The method for producing the plastic lens with the antireflection film of the invention includes applying water or an aqueous solution to a plastic lens with an organosilicon compound-containing hard coat film to form a liquid film of water or the aqueous solution on the surface of the hard coat film, allowing ozone gas to contact with the liquid film to treat the surface of the hard coat film with the ozone gas, and thereafter forming an antireflection film on the treated surface of the hard coat film by vapor deposition. The production method of the invention provides a plastic lens with an antireflection film which has the advantages of good abrasion resistance and good adhesion of the antireflection film to any type of hard coat film that underlies it.

DETAILED DESCRIPTION OF THE INVENTION

Examples of the lens production method of the invention and the apparatus for carrying out this method are described in detail hereafter with reference to the drawings attached hereto.

Figure 1:
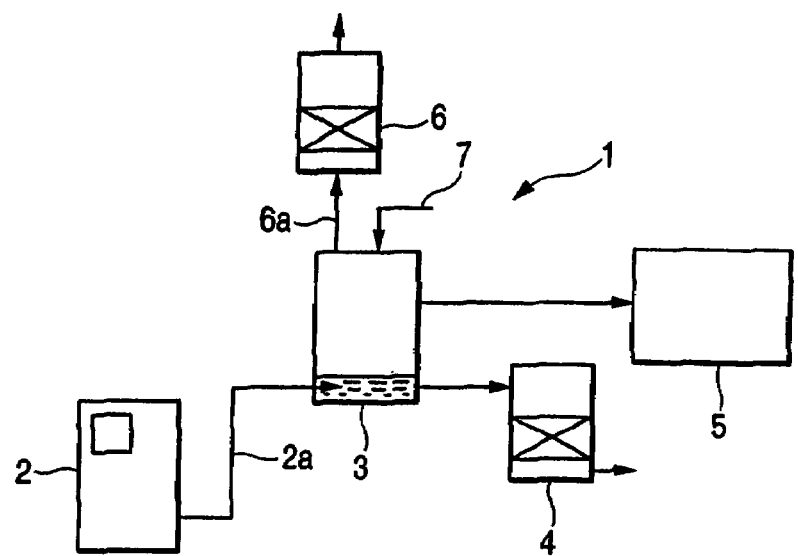
FIG. 1 shows an ozone gas-treating apparatus for carrying out the method of the invention of producing a plastic lens with an antireflection film.

FIG. 1 shows an ozone-treating apparatus 1 for use in performing the method of the invention, which basically comprises a known ozone gas generator 2; an ozone gas-feeding duct 2a; an ozone-treating tank 3 for contacting ozone gas with the surface of a hard coat film on a lens; an aqueous ozone waste-decomposing unit 4; a post-treating unit 5 for performing treatments such as drying of the lens; an ozone gas-decomposing unit 6; a solution-feeding duct 7; and an ejection tube 8 through which ozone gas is ejected toward the lens in the ozone-treating tank 3.

Figure 2:
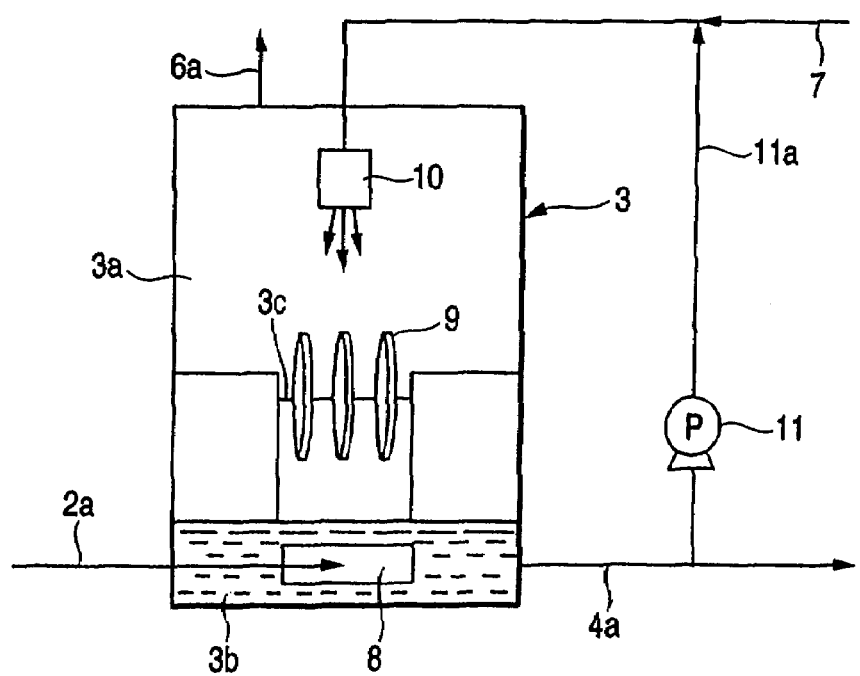
FIG. 2 shows an ozone-treating tank in the ozone gas-treating apparatus for carrying out the method of the invention of producing a plastic lens with an antireflection film.

FIG. 2 shows the ozone-treating tank 3, which basically comprises a space 3a in which water is applied to the hard coat film of the lens 9 to form a water film thereon and ozone gas is applied to the lens with the water film on it; a solution pool 3b arranged in the lower part of the ozone-treating tank 3 and having the ejection tube therein; and a holder 3c for holding the lens.

The ozone-treating apparatus 1 operates as follows. As shown in FIG. 2, the solution in the solution pool 3b is pumped to spray nozzle 10 via a circulation duct 11a by pump 11. At that time, the solution is sprayed through the spray nozzle 10 onto the hard coat film of the lens 9 to form a film of the solution. The sprayed solution that drips from the lens surface is pooled in the solution pool 3b, and may be circulated and reused. The amount of the solution spray to be applied to the lens is preferably from 0.3 to 3.5 liters/min, for example, when the volume (of the vapor part) of the treating tank 3 is about 120 liters.

The solution in the solution pool 3b is preferably water, ozone water, or an aqueous solution that contains a radical scavenger. The radical scavenger may be any known one, including, for example, hydrogen carbonates such as sodium hydrogen carbonate, and phosphates such as sodium phosphate. The concentration of the radical scavenger in the solution is preferably from 0.01 mols/liter up to a saturated concentration thereof, more preferably from 0.1 mols/liter to 1.00 mol/liter, in view of the adhesion of the hard coat film to the antireflection film. Preferably, the temperature of the solution pool 3b falls between about 15° C. and about 30° C.

The ozone gas generator 2 generates ozone gas. Thus generated, the ozone gas moves to the ejection tube 8 which has orifices formed therein, via the feeding duct 2a, and then this ozone gas is ejected out into the ozone-treating tank 3 through the orifices. In this stage, the flow rate of the ozone gas that is fed through the feeding duct 2a is preferably from 2 to 3 liters/min, for example, when the volume (of the vapor part) of the treating tank 3 is about 120 liters. Though depending on the type of the hard coat film of the lens and on the type of the antireflection film to be formed thereon, the ozone gas concentration to be fed through the feeding duct 2a is generally 50 g/Nm$^3$ or more, preferably 100 g/Nm$^3$ or more, more preferably 140 g/Nm$^3$ or more for attaining good adhesion of the hard coat film to the antireflection film. Preferably, the temperature of the ozone gas to be fed falls between 15 and 40° C.

The ozone gas ejected out through the ejection tube 8 is allowed to come into contact with the solution pool 3b of the ozone-treating tank 3. The ozone gas thus allowed to contact the solution pool 3b first dissolves in the solution in the solution pool 3b, but after it has reached the saturation point, it does not dissolve further in the solution and moves upward and is brought into contact with the lenses 9. Based on this principle, the liquid film of the lens 9 is treated with ozone gas. The treating time preferably falls between 10 seconds and 10 minutes, though varying depending on the ozone gas concentration and the composition of the hard coat film. If the treating time is too long, the hard coat film may peel off. Therefore, the treatment is carried out to such a degree that the hard coat film does not peel because the treatment time is too long.

When it is not necessary to use the solution in the solution pool 3b any more, it is led to the aqueous ozone waste-decomposing unit 4 via a transfer duct 4a, and processed therein. The ozone gas in the treating tank is led to the ozone-decomposing unit 6 via ozone gas transfer duct 6a, and is then discharged out of the apparatus. When a fresh solution is needed, it is fed into the solution pool 3 via the solution-feeding duct 7.

The organosilicon compound used to form the hard coat film is, for example, at least one selected from compounds of general formula (I):

(I)

wherein R$^1$ and R$^3$ each independently represent a monovalent hydrocarbon group having from 1 to 10 carbon atoms, with or without a functional group; R$^2$ represents an alkyl group having from 1 to 8 carbon atoms, an aryl group having from 6 to 10 carbon atoms, an aralkyl group having from 7 to 10 carbon atoms or an acyl group having from 1 to 8 carbon atoms; a and b each independently indicate 0 or 1; and a plurality of the OR$^2$ groups may be the same or different from each other, and compounds of general formula (II):

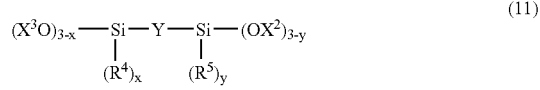

(11)

wherein R$^4$ and R$^5$ each independently represent a monovalent hydrocarbon group having from 1 to 5 carbon atoms, with or without a functional group; X$^1$ and X$^2$ each independently represent an alkyl group having from 1 to 4 carbon atoms or an acyl group having from 1 to 4 carbon atoms; Y represents a divalent hydrocarbon group having from 1 to carbon atoms; x and y each independently indicate 0 or 1; a plurality of the X$^1$ groups may be the same or different from each other; and a plurality of the X$^2$ groups may be the same or different from each other, and hydrolyzates of the compounds of formula (I) and formula (II).

In formula (I), the monovalent hydrocarbon group having from 1 to 10 carbon atoms for R$^1$ and R$^3$ includes an alkyl group having from 1 to 10 carbon atoms, an alkenyl group having from 2 to 10 carbon atoms, an aryl group having from 6 to 10 carbon atoms, and an aralkyl group having from 7 to 10 carbon atoms. The alkyl and alkenyl groups may be linear, branched or cyclic. Examples of the alkyl group having from 1 to 10 carbon atoms include methyl, ethyl, n-propyl, isopropyl, n-butyl, isobutyl, sec-butyl, tert-butyl, pentyl, hexyl, octyl, cyclopentyl and cyclohexyl groups. Examples of the alkenyl group having from 2 to 10 carbon atoms include vinyl, allyl, butenyl, hexenyl and octenyl groups. Examples of the aryl group having from 6 to 10 carbon atoms include phenyl, tolyl, xylyl and naphthyl groups. Examples of the aralkyl group having from 7 to 10 carbon atoms include benzyl, phenethyl and naphthylmethyl groups.

These hydrocarbon groups may have a functional group introduced thereinto. These functional group include, for example, a halogen atom, a glycidoxy group, an epoxy group, an amino group, a cyano group, a mercapto group, and a (meth)acryloxy group. Examples of the monovalent hydrocarbon group having from 1 to 10 carbon atoms with such a functional group include glycidoxymethyl, α-glycidoxyethyl, β-glycidoxyethyl, α-glycidoxypropyl, β-glycidoxypropyl, γ-glycidoxypropyl, α-glycidoxybutyl, β-glycidoxybutyl, γ-glycidoxybutyl, δ-glycidoxybutyl, (3,4-epoxycyclohexyl)methyl, β-(3,4-epoxycyclohexyl)ethyl, γ-(3,4-epoxycyclohexyl)propyl, δ-(3,4-epoxycyclohexyl) butyl, chloromethyl, γ-chloropropyl, 3,3,3-trifluoropropyl, γ-methacryloxypropyl, γ-acryloxypropyl, γ-mercaptopropyl, β-cyanoethyl, N-(β-aminoethyl)-γ-aminopropyl and γ-aminopropyl groups.

On the other hand, the alkyl group having from 1 to 8 carbon atoms for R$^2$ may be linear, branched or cyclic. Examples thereof include methyl, ethyl, n-propyl, isopropyl, n-butyl, isobutyl, sec-butyl, tert-butyl, pentyl, hexyl, cyclopentyl and cyclohexyl groups. Examples of the aryl group having from 6 to 10 carbon atoms for R$^2$ include phenyl, tolyl and xylyl groups; and examples of the aralkyl group having from 7 to 10 carbon atoms for R$^2$ include benzyl and phenethyl groups. The acyl group having from 1 to 8 carbon atoms for R$^2$ is, for example, an acetyl group.

Examples of the compounds of formula (I) include methyl silicate, ethyl silicate, n-propyl silicate, isopropyl silicate, n-butyl silicate, sec-butyl silicate, tert-butyl silicate, tetraacetoxysilane, methyltrimethoxysilane, methyltripropoxysilane, methyltriacetoxysilane, methyltributoxysilane, methyltriamyloxysilane, methyltriphenoxysilane, methyltribenzyloxysilane, methyltriphenethyloxysilane, glycidoxymethyltriethoxysilane, glycidoxymethyltrimethoxysilane, α-glycidoxyethyltrimethoxysilane, α-glycidoxyethyltriethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltriphenoxysilane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltriethoxysilane, (3,4-epoxycyclohexyl)methyltrimethoxysilane, β-(3-(3,4-epoxycyclohexyl)ethyltriethoxysilane, β-(3-(3,4-epoxycyclohexyl)ethyltrimethoxysilane, β-(3-(3,4-epoxycyclohexyl)ethyltripropoxysilane, β-(3-(3,4-epoxycyclohexyl)ethyltributoxysilane, β-(3-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldiethoxysilane, α-glycidoxypropylmethyldimethoxysilane, β-glycidoxypropylmethyldimethoxysilane, α-glycidoxypropylmethyldiethoxysilane, γ-glycidoxypropylmethyldimethoxysilane, γ-glycidoxypropylmethyldimethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, γ-glycidoxypropylphenyldimethoxysilane, γ-glycidoxypropylphenyldiethoxysilane, ethyltrimethoxysilane, ethyltriethoxysilane, vinyltrimethoxysilane, vinyltriacetoxysilane, vinyltriethoxysilane, phenyltrimethoxysilane, phenyltriethoxysilane, phenyltriacetoxysilane, γ-chloropropyltrimethoxysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, N-(β-aminoethyl)-γ-aminopropyltrimethoxysilane, N-(β-aminoethyl)-γ-aminopropylmethyldimethoxysilane, γ-aminopropylmethyldimethoxysilane, N-(β-aminoethyl)-γ-aminopropylmethyldiethoxysilane, dimethyldimethoxysilane, phenylmethyldimethoxysilane, dimethyldiethoxysilane, phenylmethyldiethoxysilane, γ-chloropropylmethyldiethoxysilane, γ-chloropropylmethyldimethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptopropylmethyldiethoxysilane, methylvinyldimethoxysilane, and methylvinyldiethoxysilane.

On the other hand, in formula (II), the alkyl group having from 1 to 4 carbon atoms for $X^1$ and $X^2$ includes methyl, ethyl, n-propyl, isopropyl, n-butyl, isobutyl, sec-butyl and tert-butyl groups; and the acyl group having from 1 to 4 carbon atoms is, for example, preferably an acetyl group. These $X^1$ and $X^2$ may independently be the same or different from each other.

The monovalent hydrocarbon group having from 1 to 5 carbon atoms for $R^4$ and $R^5$ includes an alkyl group having from 1 to 5 carbon atoms, and an alkenyl group having from 2 to 5 carbon atoms. These may be linear or branched. Examples of the alkyl group include methyl, ethyl, n-propyl, isopropyl, n-butyl, sec-butyl, tert-butyl and pentyl groups. Examples of the alkenyl group include vinyl, allyl and butenyl groups. These hydrocarbon groups may have a functional group introduced thereinto. For the functional group and the functional group-having hydrocarbon group, those mentioned hereinabove for $R^1$ and $R^3$ in formula (I) are exemplified. These $R^4$ and $R^5$ may be the same or different from each other.

For the divalent hydrocarbon group having from 1 to 20 carbon atoms for Y, an alkylene group and an alkylidene group are preferred and examples thereof include, for example, methylene, ethylene, propylene, butylene, pentylene, hexylene, octylene, ethylidene and propylidene groups.

Examples of the compounds of formula (II) include methylenebis(methyldimethoxysilane), ethylenebis(ethyldimethoxysilane), propylenebis(ethyldiethoxysilane), and butylenebis(methyldiethoxysilane).

The organosilicon compound to be contained in the hard coat film in the invention may be one selected from the compounds of formulas (I) and (II) and their hydrolyzates, or may be a combination of two or more selected from them. The hydrolyzates may be prepared by adding an aqueous basic solution such as an aqueous solution of sodium hydroxide or ammonia, or an aqueous acidic solution such as an aqueous solution of hydrochloric acid, acetic acid or citric acid to the compound of formula (I) or (II), followed by stirring.

The hard coat film may contain metal oxide fine particles (in colloid form, for example). The metal oxide fine particles are not specifically limited, and may be arbitrary selected from any particles that are known to be or may be found to be suitable for use in hard coat films for plastic lenses. Examples of the metal oxide fine particles include fine particles of a single metal oxides such as aluminum oxide, titanium oxide, antimony oxide, tin oxide, zirconium oxide, silicon oxide, cerium oxide, iron oxide; as well as fine particles of a composite oxide, for example, fine particles of a composite tin oxide-zirconium oxide-tungsten oxide as disclosed in JP-A-6-25603; fine particles of a composite tin oxide-tungsten oxide as disclosed in JP-A-3-217230; fine particles of a composite metal oxide of titanium oxide, cerium oxide and silicon oxide as disclosed in JP-A-8-113760; fine particles of a composite titanium oxide-zirconium oxide-tin oxide as disclosed in JP-A-10-306258; fine particles of a composite titanium oxide-zirconium oxide-silicon oxide, and those of a composite stannic oxide-zirconium oxide-tungsten oxide as disclosed in JP-A-9-21901. Of these metal oxide fine particles known to be suitable for use in this invention, at least one type selected from silicon oxide fine particles, titanium oxide fine particles and tin oxide fine particles is preferred.

The mean particle size of the metal oxide fine particles may fall generally between 1 and 500 nm. These metal oxide fine particles may be used either singly or as a combination of two or more.

In the invention, the hard coat film is formed, for example, by coating a plastic lens substrate with a coating composition. If desired, the coating composition may contain various organic solvents and surfactants for improving the wettability of the substrate with the composition, thereby improving the surface smoothness of the hard coat film.

An organic solvent is optionally added to the coating composition for uniformly hydrolyzing the component in the composition and for controlling the degree of hydrolysis. Preferred examples of the organic solvent include cellosolves such as methyl cellosolve, ethyl cellosolve and butyl cellosolve. More preferably for the organic solvent, such a cellosolve is combined with any of isopropyl alcohol or butyl alcohol. In this case, the cellosolve content is preferably 3% by weight or more, more preferably 10% by weight or more. Further if desired, the coating liquid for the hard coat film may contain a silicone surfactant for improving the surface smoothness of the hard coat film formed of it. In addition, for improving the lightfastness of the hard coat film and for preventing the film from deterioration, a UV absorbent, antioxidant, light stabilizer, antiaging agent and/or like agent may be added to the coating composition to an extent that does not interfere with the physical properties of the hard coat film formed on the lens surface. Thus prepared, the viscosity and solids content of the coating liquid are not specifically restricted, so far as it is advantageous applicable to coat the plastic lenses.

For applying the coating composition onto the surfaces of the plastic lens, an ordinary method such as dipping, spin coating, or spraying may be employed. In order to provide high face accuracy of the film formed of the composition, especially preferred is dipping or spin coating. The composition is cured by drying it in hot air or by exposing it to active energy rays. Preferably, it is cured in hot air at 70 to 200° C., more preferably at 90 to 150° C. For the active energy rays, preferred are far-infrared rays, which suppress damage of the film by heat in a low degree.

The plastic lenses to be processed in the invention are not specifically limited, and examples thereof include, for example, methyl methacrylate homopolymers, copolymers of methyl methacrylate with at least one other monomer, diethylene glycol bisallylcarbonate homopolymers, copolymers of diethylene glycol bisallylcarbonate with at least one other monomer, sulfur-containing copolymers, halogen-containing copolymers, polycarbonates, polystyrenes, polyvinyl chlorides, unsaturated polyesters, polyethylene terephthalates, polyurethanes, and polythiourethanes.

In the method for producing the plastic lens of the invention, the hard coat film formed on the lens is coated with an aqueous liquid film which in turn is treated with ozone. Before the thus-treated hard coat film is further coated with an antireflection film, it may be ultrasonically rinsed in a tank and then washed with an alkali for removing any impurities adhering thereto.

The inorganic oxide to be used in the invention for forming the antireflection film is not specifically limited and substances generally known for use as materials of ordinary antireflection films may be used. For example, they include $Ta_2O_5$, $Y_2O_3$, $ZrO_2$, $SiO_2$, $TiO_2$, $Al_2O_3$, and $Nb_2O_5$. The antireflection film may be formed by vapor deposition, which, however, may be combined with any suitable type of ion beam-assisted deposition, sputtering or ion plating, if desired.

The antireflection film may be single-layered or multi-layered. In view of its reflectivity, adhesion to the underlying hard coat film and abrasion resistance, it is preferable that the vapor deposition layer of the antireflection film that is in contact with the hard coat film be formed mainly of silicon dioxide. When the antireflection film is single-layered, its optical thickness is preferably $0.25\lambda_0$ ($\lambda_0$=450 to 650 nm). For the antireflection film, also preferred are multi-layered films, for example, a two-layered film of $0.25\lambda_0/0.25\lambda_0$ in optical thickness, in which the two layers differ in refractive index, or a three-layered film of $0.25\lambda_0/0.5\lambda_0/0.25\lambda_0$ or $0.25\lambda_0/0.25\lambda_0/0.25\lambda_0$ in optical thickness in which the three layers differ in refractive index, or other multi-layered films that are partly substituted with any other equivalent film.

If desired, an undercoat layer of, for example, a metal film of niobium or a metal oxide film of silicon dioxide or aluminum oxide may be disposed between the antireflection film and the hard coat film formed of the coating composition according to the invention.

Also if desired, a primer film may be disposed between the hard coat film and the plastic lens substrate, in order to improve the impact resistance of the coated lens and the adhesion of the hard coat film to the lens substrate, for example, as disclosed in JP-A-3-109502. One example of this primer film is an urethane film formed of a polyisocyanate and a polyol as raw materials. The polyisocyanate includes, for example, adducts prepared by bonding a few molecules of any of hexamethylene diisocyanate, 4,4'-cyclohexylmethane diisocyanate or hydrogenated xylylene diisocyanate by various methods; and isocyanurates, allophanates, biurets or carbodiimides blocked with any of acetacetic acid, malonic acid or methyl ethyl ketoxime. The suitable polyols include, for example, polyesters, polyethers, polycaprolactones, polycarbonates and polyacrylates having two or more hydroxyl groups in one molecule. Also if desired, the primer film may contain metal fine oxide particles such as titanium oxide fine particles for improving its refractivity.

The invention is described in more detail with reference to the following Examples, which, however, are not intended to restrict the scope of the invention. The physical properties of the samples in Examples and Comparative Examples were evaluated according to the methods mentioned below.

(a) Abrasion resistance: The plastic lenses with antireflection film obtained in the Examples were dipped in warm water at 50° C. for 48 hours, and then rubbed with 0000 steel wool (produced by Japan Steel Wool Corp.) under a load of 1 $kgf/cm^2$ in the direction where the steel wool meets the lens surface at right angles. After rubbed 20 times (back and forth) in that manner, the condition of each sample was evaluated for the scratch resistance in accordance with the criteria mentioned below.

UA: Few scratches found.
A: Only a few scratches found.
B: Some scratches found.
C: Many scratches found.

(b) Adhesion: Each of the plastic lenses with antireflection film obtained in the Examples were dipped in warm water at 50° C. for 48 hours, and 10×10 cross-cuts of 1 mm square were cut into the surface of the hard coat film on the lens face. An adhesive tape of Cellophane (manufactured by Nichiban No. 405) was tightly stuck to each sample, and rapidly peeled off at a 90 degree angle. The number of cross-cuts remaining on each sample was counted.

(c) YI value: Before and after being treated with ozone, the hard coat film of each sample was analyzed with a spectrometer U3410 (manufactured by Hitachi Ltd., trade name). From the XYZ values of each sample thus analyzed in the visual field of 2° from the light source C, the YI value thereof was derived.

EXAMPLES 1 TO 12, AND COMPARATIVE
EXAMPLES 1 TO 5

As set forth in Table 1, each plastic lens substrate (a) to (c) was coated with a hard coat film (A) to (C) and with an antireflection film (α) to (γ). The concentration and the flow rate of the ozone gas used for treating the hard coat film, and the type and the flow rate of the processing water used for forming a liquid film on the hard coat film are shown in Table 1. Under these conditions, plastic lenses with antireflection film were produced. The details of the plastic lens substrates (a) to (c), the hard coat films (A) to (C), the antireflection films (α) to (γ), the method of treating the hard coat film with ozone gas and the method of forming the antireflection film are mentioned below.

(1) Plastic lens substrate: The plastic lens substrates (a) to (c) used herein are as follows:

Plastic lens substrate (a): TESLALID (having a refractive index of 1.71; trade name manufactured by Hoya—this is used in Example 1 and Comparative Example 1).

Plastic lens substrate (b): EYAS (having a refractive index of 1.60) (Trade name, manufactured by Hoya)—this is used in Examples 2 and 3 and Comparative Example 2).

Plastic lens substrate (c): diethylene glycol bisallylcarbonate polymer (having a refractive index of 1.499—this is used in Examples 4 to 12 and Comparative Examples 3 to 5).

(2) Preparation of hard coat liquid and formation of hard coat film: Hard coat films (A) to (C) mentioned below were formed.

Preparation of Hard Coat Liquid (A), and Formation of Hard Coat Film of it (the Hard Coat Film Contains Composite Fine Particles of Titanium Oxide, Zirconium Oxide and Silicon Oxide; this is Formed in Example 1 and Comparative Example 1):

1045 parts by weight of γ-glycidoxypropyl(trimethoxy)silane and 200 parts by weight of γ-glycidoxypropylmethyl(diethoxy)silane were put into a stainless reactor, and 299 parts by weight of hydrochloric acid (0.01 mols/liter) were added thereto with stirring. The stirring was continued for one full day in a clean room at 10° C. to obtain a silane hydrolyzate.

In another reactor, 4018 parts by weight of methyl cellosolve and 830 parts by weight of isopropanol were added to and mixed with 3998 parts by weight of a composite fine particle sol of titanium oxide, zirconium oxide and silicon oxide (dispersed in methanol, having a total solid content of 30% by weight and having a mean particle size of from 5 to 8 microns) with stirring, and 4 parts by weight of a silicone surfactant (manufactured by Nippon Unicar L-7001) and 100 parts by weight of aluminium acetylacetonate were added thereto. Like the hydrolyzate discussed above, it was stirred for one full day in a clean room at 10° C., and then this was combined with the hydrolyzate and further stirred for one full day. Thereafter, this was filtered through a 3-μm filter to obtain a hard coat liquid (A).

Next, the plastic lens was dipped in the hard coat liquid (A) for 20 seconds, pulled up at a pulling rate of 20 cm/min, and then heated in an oven set at 110° C. for 1 hour. Thus processed, the plastic lens was coated with a hard coat film (A).

Preparation of Hard Coat Liquid (B), and Formation of Hard Coat Film of it (the Hard Coat Film Contains Composite Fine Particles of Stannic Oxide-Zirconium Oxide; this is Formed in Examples 2 and 3 and Comparative Example 2):

142 parts by weight of γ-glycidoxypropyltrimethoxysilane were put into a glass reactor equipped with a magnetic stirrer, and 1.4 parts by weight of 0.01 N hydrochloric acid and 32 parts by weight of water were added dropwise thereto with stirring. This was then stirred for 24 hours to obtain a hydrolyzate of γ-glycidoxypropyltrimethoxysilane. Next, 460 parts by weight of stannic oxide-zirconium oxide composite fine particles (dispersed in methanol, having a total metal oxide content of 31.5% by weight and having a mean particle size of from 10 to 15 millimicrons), 300 parts by weight of ethyl cellosolve, 0.7 parts by weight of a silicone surfactant serving as a lubricant, and 8 parts by weight of a curing agent, aluminum acetyl acetonate were added to the γ-glycidoxypropyltrimethoxysilane hydrolyzate, well stirred, and then filtered to obtain a hard coat liquid (B).

Next, the plastic lens was dipped in an aqueous alkali solution and washed well. Then, this was dipped in the hard coat liquid (B), pulled up at a pulling rate of 14 cm/min, and heated in an oven set at 120° C. for 1 hour. Thus processed, the plastic lens was coated with a hard coat film (13).

Preparation of Hard Coat Liquid (C), and Formation of Hard Coat Film of it (the Hard Coat Film Contains Silicon Oxide Fine Particles; this is Formed in Examples 4 to 12 and Comparative Examples 3 to 5):

120 parts by weight of γ-glycidoxypropyltrimethoxysilane were put into a glass reactor equipped with a magnetic stirrer, and 27 parts by weight of 0.1 N hydrochloric acid were added dropwise thereto with stirring. This was then stirred for 24 hours to obtain a hydrolyzate of the silane. Next, 200 parts by weight of water-dispersed silica fine particles (having a solid content of 20% and having a mean particle size of 15 millimicrons), 100 parts by weight of isopropyl alcohol and 100 parts by weight of ethyl cellosolve both serving as a solvent, 1 part by weight of a silicone surfactant serving as a lubricant, and 7 parts by weight of a curing agent, aluminum acetylacetonate were added to the hydrolyzate, stirred well, and then filtered to obtain a hard coat liquid (C).

Next, the plastic lens was dipped in an aqueous alkali solution and washed well. Then, this was dipped in the hard coat liquid (C), pulled up at a pulling rate of 14 cm/min, and heated in an oven set at 120° C. for 1 hour. Thus processed, the plastic lens was coated with a hard coat film (C).

(3) Treatment with ozone gas: The ozone gas-treating apparatus of FIGS. 1 and 2 was used. For the solution in the solution pool 3b in the treating tank 3 shown in FIGS. 1 and 2, pure water (in Examples 1, 2 and 6) or a solution of sodium hydrogen carbonate of 0.05 mols/liter to 0.2 mols/liter (in Examples 3 to 5, and 7 to 12) was used. The concentration of ozone flowing through the ejection tube 8 in FIG. 2 was from 70 to 180 g/Nm$^3$. The ozone gas flow rate through the ejection tube 8 in FIG. 2 was from 2.5 to 2.7 liters/min, and the spray ejected out of the spray nozzle 10 to form a liquid film on the hard coat film was from 2 to 2.6 liters/min, as in Table 1. The volume of the space in the treating tank 3 was 118 liters (430×430×640 mm). The solution temperature in the solution pool 3b was between 19° C. and 25° C.; and the ozone gas temperature fell between 21° C. and 36° C.

(4) Washing after treatment with ozone gas: After being treated with ozone gas, the plastic lens was dipped in warm water (pure water of from 1 to 10 μs/cm, at 55° C.) for 30 seconds for rinsing, and then in an alkali solution (containing 0.3% anionic surfactant) at 48° C. for 75 seconds for removing any impurities adhering to the hard coat film.

(5) Formation of antireflection film: After the treatment with ozone gas and washing as in (4), each plastic lens was coated with any of the following three antireflection films.

Formation of antireflection film (α) (in Example 1 and Comparative Example 1): Evaporating materials were deposited through vacuum evaporation on the hard coat film of each plastic lens to form thereby a 7-layered antireflection film of $SiO_2$ (0.125 λ)/$Ta_2O_5$ (0.05 λ)/$SiO_2$ (0.5 λ)/$Ta_2O_5$ (0.125 λ) /$SiO_2$ (0.05 λ)/$Ta_2O_5$ (0.25 λ)/$SiO_2$ (0.25 λ) on the hard coat layer in that order. In this, λ is 500 nm.

Formation of antireflection film (β) (in Examples 2 and 3, and Comparative Example 2): $SiO_2$ ¾ λ thick was deposited on the hard coat film of each plastic lens through vacuum evaporation to be a first layer. On the other hand, $Nb_2O_5$ powder, $ZrO_2$ powder and $Y_2O_3$ powder were mixed, shaped under pressure and sintered to prepare an evaporating composition. This was deposited on the first layer along with $SiO_2$ to form thereon a composite layer ¼λ thick. Next, another composite layer of evaporating composition/$SiO_2$/evaporating composition ½ λ thick was deposited thereon; and finally $SiO_2$ ¼ λ thick was deposited thereon to form a multi-layered antireflection film on the hard coat layer. In this, λ is 500 nm.

Formation of antireflection film (γ) (in Examples 4 to 12, and Comparative Examples 3 to 5): $SiO_2$ ⅝ λ thick was deposited on the hard coat film of each plastic lens through vacuum evaporation to be a first layer. With that, $ZrO_2$ about 1/17 λ thick was deposited thereon, and then $SiO_2$ was thereon to form a second layer of $SiO_2$ and $ZrO_2$ having an overall thickness of λ/4. Further, $ZrO_2$ about ½ λ thick was deposited thereon to be a third layer; and finally $SiO_2$ ¼ λ thick was thereon to complete a multi-layered antireflection film on the hard coat film. In this, λ is 500 nm.

The coated plastic lens samples of Examples 4 to 12 had the same substrate, hard coat film and composition of the antireflection film, but differed with respect to the processing water, the processing time and the ozone concentration in treating the hard coat film of each sample.

In Comparative Example 1, the same substrate as in Example 1 was coated with the same hard coat film, but this was directly washed as in Example 1, without being coated with a liquid film or treated with ozone gas, and thereafter this was coated with the same antireflection film as in Example 1.

In Comparative Example 2, the same substrate as in Example 2 was coated with the same hard coat film, but this was directly washed as in Example 2, without being coated with a liquid film or treated with ozone gas, and thereafter this was coated with the same antireflection film as in Example 2.

In Comparative Example 3, the same substrate as in Examples 4 to 12 was coated with the same hard coat film, but this was directly washed as in Examples 4 to 12, without being coated with a liquid film nor treated with ozone gas, and thereafter this was coated with the same antireflection film as in Examples 4 to 12.

In Comparative Example 4, the same substrate as in Examples 4 to 12 was coated with the same hard coat film, and this was, after being treated with ozone gas alone (at 15 to 40° C.) but not coated with a liquid film prior to the treatment, washed as in Examples 4 to 12, and thereafter this was coated with the same antireflection film as in Examples 4 to 12.

In Comparative Example 5, the same substrate as in Examples 4 to 12 was coated with the same hard coat film, and this was, after being dipped in ozone water (at 15 to 40° C.) but not coated with a liquid film prior to the dipping, washed as in Examples 4 to 12, and thereafter this was coated with the same antireflection film as in Examples 4 to 12.

The plastic lenses obtained in Examples 1 to 12 and Comparative Examples 1 to 5 were tested according to test methods (a) to (c) mentioned above. The results are given in Table 2.

TABLE 1

|   |   | Plastic Lens Substrate | Hard Coat Film | Antireflection Film | Method of Ozone Gas Treatment | Ozone Treating Time (sec) | Ozone Gas Concentration (g/Nm³) | Ozone Gas Flow Rate (liter/min) | Solution for Liquid Film Formation | Solution Flow Rate (liter/min) |
|---|---|---|---|---|---|---|---|---|---|---|
| Examples | 1 | a | A | α | water spray + ozone gas | 60 | 145 | 2.7 | pure water | 2 |
|  | 2 | b | B | β | water spray + ozone gas | 60 | 140 | 2.5 | pure water | 2.5 |
|  | 3 | b | B | β | water spray + ozone gas | 60 | 140 | 2.5 | 0.2 mols/liter $NaHCO_3$ | 2.5 |
|  | 4 | c | C | γ | water spray + ozone gas | 60 | 140 | 2.6 | 0.2 mols/liter $NaHCO_3$ | 2.1 |
|  | 5 | c | C | γ | water spray + ozone gas | 240 | 140 | 2.7 | 0.1 mols/liter $NaHCO_3$ | 2.3 |
|  | 6 | c | C | γ | water spray + ozone gas | 60 | 140 | 2.7 | pure water | 2.6 |
|  | 7 | c | C | γ | water spray + ozone gas | 30 | 125 | 2.7 | 0.2 mols/liter $NaHCO_3$ | 2.6 |
|  | 8 | c | C | γ | water spray + ozone gas | 30 | 150 | 2.7 | 0.05 mols/liter $NaHCO_3$ | 2.2 |
|  | 9 | c | C | γ | water spray + ozone gas | 300 | 140 | 2.7 | 0.05 mols/liter $NaHCO_3$ | 2.4 |
|  | 10 | c | C | γ | water spray + ozone gas | 120 | 180 | 2.7 | 0.2 mols/liter $NaHCO_3$ | 2.4 |
|  | 11 | c | C | γ | water spray + ozone gas | 120 | 70 | 2.4 | 0.2 mols/liter $NaHCO_3$ | 2.5 |
|  | 12 | c | C | γ | water spray + ozone gas | 120 | 110 | 2.4 | 0.2 mols/liter $NaHCO_3$ | 2.5 |
| Comp. Examples | 1 | a | A | α | No | — | — | — | — | — |
|  | 2 | b | B | β | No | — | — | — | — | — |
|  | 3 | c | C | γ | No | — | — | — | — | — |
|  | 4 | c | C | γ | ozone gas | 60 | 120 | 2.7 | — | — |
|  | 5 | c | C | γ | dipping in ozone water | 600 | 140 | 2.7 | pure water | 0 |

TABLE 2

| | | Abrasion Resistance after treatment in warm water | Adhesion after accelerated aging (Adhesion after treatment in warm water) | YI Value before ozone treatment (hard coat lenses) | YI Value after ozone treatment (hard coat lenses) |
|---|---|---|---|---|---|
| Examples | 1 | A | 100 | 2.18 | 2.18 |
| | 2 | UA | 100 | 1.05 | 1.05 |
| | 3 | UA | 100 | 1.05 | 1.05 |
| | 4 | UA | 100 | 0.81 | 0.80 |
| | 5 | UA | 100 | 0.81 | 0.81 |
| | 6 | UA | 100 | 0.81 | 0.82 |
| | 7 | UA | 100 | 0.80 | 0.80 |
| | 8 | UA | 100 | 0.82 | 0.81 |
| | 9 | UA | 100 | 0.81 | 0.82 |
| | 10 | UA | 100 | 0.81 | 0.80 |
| | 11 | UA | 100 | 0.82 | 0.82 |
| | 12 | UA | 100 | 0.81 | 0.82 |
| Comparative Examples | 1 | C | 0 | 2.18 | — |
| | 2 | A | 98 | 1.05 | — |
| | 3 | UA | 0 | 0.81 | — |
| | 4 | UA | 90 | 0.81 | 0.82 |
| | 5 | UA | 50 | 0.81 | 0.81 |

What is claimed is:

1. A process for producing a plastic lens with an antireflection film on a surface thereof, comprising:
applying water or an aqueous solution comprising a radical scavenger to a plastic lens having an organosilicon compound-containing hard coat film formed on a surface thereof to form a liquid film of water or the aqueous solution on the surface of the hard coat film,
allowing ozone gas to contact with the liquid film so as to treat the surface of the hard coat film with the ozone gas, and
forming the antireflection film on the ozone gas treated surface of the hard coat film by vapor deposition
wherein the organosilicon compound used to form the hard coat film is at least one compound selected from compounds of general formula (I):

$$(R^1)_a(R^3)_b Si(OR^2)_{4-(a+b)} \qquad (I)$$

wherein $R^1$ and $R^3$ each independently represent a monovalent hydrocarbon group having from 1 to 10 carbon atoms, with or without a functional group; $R^2$ represents an alkyl group having from 1 to 8 carbon atoms, an aryl group having from 6 to 10 carbon atoms, an aralkyl group having from 7 to 10 carbon atoms or an acyl group having from 1 to 8 carbon atoms; a and b each independently indicate 0 or 1; and a plurality of the $OR^2$ groups may be the same or different from each other,
wherein the hard coat film comprises silicon oxide particles, and
wherein the first layer of the vacuum evaporated antireflection film comprises $SiO_2$.

2. The process for producing a plastic lens with an antireflection film of claim 1, comprising spraying the water or the aqueous solution on the hard coat film to form the liquid film on the hard coat film.

3. The process for producing a plastic lens with an antireflection film of claim 1, wherein the water or the aqueous solution further comprises ozone gas.

4. The process for producing a plastic lens with an antireflection film of claim 1, wherein the radical scavenger is a hydrogen carbonate or a phosphate.

5. The process for producing a plastic lens with an antireflection film of claim 4, wherein the aqueous solution contains the radical scavenger in an amount of 0.01 mols/liter or more based on the aqueous solution.

6. The process for producing a plastic lens of claim 1, wherein the hard coat film contains metal oxide fine particles.

7. The process for producing a plastic lens of claim 6, wherein the metal oxide fine particles comprise titanium oxide particles or tin oxide particles.

8. The process for producing a plastic lens of claim 1, wherein the plastic lens comprises at least one resin selected from the group consisting of a polythiourethane resin, an epithio group-containing resin and a diethylene glycol bisallylcarbonate-containing resin.

9. The process for producing a plastic lens of 1, wherein the concentration of the ozone gas allowed to contact the liquid film on the hard coat film is 50 g/Nm³ or more.

10. The process for producing a plastic lens of claim 1, wherein the concentration of the ozone gas allowed to contact the liquid film on the hard coat film is 100 g/Nm³ or more.

11. The process for producing a plastic lens of claim 1, wherein the concentration of the ozone gas allowed to contact the liquid film on the hard coat film is 140 g/Nm³ or more.

12. The process for producing a plastic lens as claimed in claim 1, wherein the time for contacting the ozone gas with the liquid film is between about 10 seconds and about 10 minutes.

13. The process for producing a plastic lens with an antireflection film of claim 1, wherein the organosilicon compound used to form the hard coat film is at least one compound selected from compounds of general formula (III):

$$(R^4)Si(OR^2)_3 \qquad (III)$$

$R^2$ represents an alkyl group having from 1 to 8 carbon atoms, $R^4$ represents a γ-glycidoxypropyltrimethoxy group.

14. The process for producing a plastic lens as claimed in claim 1, 2, 3, 6, 7, 8, 9, 10, 11, or 13 wherein the time for contacting the ozone gas with the liquid film is between about 10 seconds and about 10 minutes.

* * * * *